(12) United States Patent
Li et al.

(10) Patent No.: US 10,297,884 B2
(45) Date of Patent: May 21, 2019

(54) BATTERY HEATING SYSTEM

(71) Applicant: CONTEMPORARY AMPEREX TECHNOLOGY CO., LIMITED, Ningde (CN)

(72) Inventors: Qing Li, Ningde (CN); Haiming Qi, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 42 days.

(21) Appl. No.: 15/336,246

(22) Filed: Oct. 27, 2016

(65) Prior Publication Data

US 2017/0256832 A1 Sep. 7, 2017

(30) Foreign Application Priority Data

Mar. 4, 2016 (CN) .......................... 2016 1 0122397

(51) Int. Cl.
*H01M 10/6571* (2014.01)
*H01M 10/615* (2014.01)
(Continued)

(52) U.S. Cl.
CPC ..... *H01M 10/6571* (2015.04); *H01M 10/615* (2015.04); *H01M 10/625* (2015.04); *H01M 2/1077* (2013.01); *H01M 10/0525* (2013.01)

(58) Field of Classification Search
CPC .......... H01M 10/6571; H01M 2/1077; H01M 10/625; H01M 10/615; H01M 2220/20
See application file for complete search history.

(56) References Cited

U.S. PATENT DOCUMENTS

| 2014/0079967 A1* | 3/2014 | Kodama | H01M 10/0562 429/62 |
| 2014/0291309 A1* | 10/2014 | Juvani | H01M 10/5083 219/209 |

(Continued)

FOREIGN PATENT DOCUMENTS

| CN | 201956430 A | 8/2011 |
| CN | 202423516 U | 9/2012 |

(Continued)

OTHER PUBLICATIONS

From Chinese Application No. 201610122397.0, Office Action dated Sep. 4, 2017 with English translation from Global Dossier.

(Continued)

*Primary Examiner* — Muhammad S Siddiquee
(74) *Attorney, Agent, or Firm* — Ladas & Parry LLP

(57) ABSTRACT

This application relates to a battery heating system integrated by two subsystems, a heating system branch and a battery pack system branch, the battery pack system branch includes a battery package and a plurality of relays, the battery package includes a plurality of battery modules and heating subsystems, the heating subsystem includes a plurality of heaters, the battery module is assembled with at least one heater, the heater is arranged at the bottom or side of the battery module. The battery heating system can satisfy two modes of driving-heating and parking-heating-charging, and provide experience of various modes to users; the installing location of the heater is various, assembling is simple and convenient, which is suitable for different application situations; the connecting manner of the circuit of the heating system is various, connection of the circuit is simple; which can reduce the non-uniformity of battery temperature caused by heating.

9 Claims, 7 Drawing Sheets

(51) Int. Cl.
*H01M 10/625* (2014.01)
*H01M 2/10* (2006.01)
*H01M 10/0525* (2010.01)

(56) References Cited

U.S. PATENT DOCUMENTS

| | | | | |
|---|---|---|---|---|
| 2015/0144614 A1* | 5/2015 | Kim | ............ | H01M 10/63 |
| | | | | 219/494 |
| 2015/0258901 A1* | 9/2015 | Min | ............ | B60L 11/1803 |
| | | | | 320/137 |
| 2015/0323603 A1* | 11/2015 | Kim | ............ | H01M 10/625 |
| | | | | 702/58 |

FOREIGN PATENT DOCUMENTS

| | | |
|---|---|---|
| CN | 202656881 U | 1/2013 |
| CN | 202940283 U | 5/2013 |
| CN | 204167438 | 2/2015 |
| CN | 104701585 A | 6/2015 |
| CN | 205609707 U | 9/2016 |

OTHER PUBLICATIONS

From Chinese Application No. 201610122397.0, Office Action dated Mar. 20, 2018 with English translation from Global Dossier.

* cited by examiner

BATTERY HEATING SYSTEM

CROSS-REFERENCE TO RELATED APPLICATION

This application claims the benefit of and priority to Chinese Patent Application 201610122397.0 filed on Mar. 4, 2016, which is hereby incorporated in its entirety herein by reference.

TECHNICAL FIELD

The present application relates to the field of battery technologies, particularly refers to a heating system of a power battery.

BACKGROUND

Chinese utility model patent No. 204167438 discloses a heating device of a vehicle Li-ion power battery. The first relay, the heating component and the battery assembly of the device are connected in series to form a heating loop. The heating component is formed by a number of heating film connected in series, and each heating film at the side of a single battery core.

At present, when a Li-ion battery is in the temperature range from 20° C. to 40° C., the charging and discharging performance is the best, and the service life is the longest. However, the battery package on the market basically uses an air cooling manner, meanwhile integrating a solid heater thereon, such as a metal heating film or a PTC plate-type heater. Or, a liquid cooling system is used, which either has no heating function, or needs to be heated by using a heating stick. The application of a battery is limited if there is no heating function. If using a heating stick or heaters of other types, the electric energy of these heaters are all coming from the battery itself, the energy of the battery system would be consumed, which leads to reducing of the cruising distance of electric vehicle when being only electrically powered, and greatly decreasing the effective ratio of the energy used by battery package for cruising distance.

Therefore, it is needed to provide a new battery heating system, to overcome the defect mentioned above.

SUMMARY

The purpose of the present application is to provide a battery heating system, under the trend of the miniaturization, meanwhile guaranteeing the heating effect, which facilitates energy saving and mass production.

The purpose of the present application is achieved by the following technical solution: the battery heating system is integrated by two subsystems of a heating system branch and a battery pack system branch, the battery pack system branch includes a battery package and a plurality of relays, wherein: the battery package includes a plurality of battery modules and heating subsystems, the heating subsystem includes a plurality of heaters, the battery module is assembled with at least one said heater, the heater is arranged at the bottom or the side of the battery module.

Preferably, the heater is assembled or integrated into the battery module.

Preferably, the heaters are connected in series or in parallel or their combination.

Preferably, the heaters are arranged correspondingly at two sides of the battery module.

Preferably, the number of the battery module is odd or even.

Preferably, the heaters are connected in parallel, the even battery modules in the battery package are divided into at least two groups, the heaters arranged on the battery modules of different groups are connected in parallel; all the heaters on different sides of the battery modules located in the middle of the odd battery module are connected in parallel.

Preferably, the heaters arranged on the battery modules of a same group among the even battery modules are connected in series; all the heaters arranged at a same side of the battery module in the middle of the odd battery modules are connected in series.

Preferably, all the heaters are connected in series.

Preferably, the heating system branch and the battery pack system branch are controlled by four relays, so as to achieve a driving-heating mode and a parking-heating-charging mode, the relay includes a positive relay of heating, a negative relay of heating, a master positive relay and a master negative relay, the positive relay of heating and the negative relay of heating are located at the heating system branch, the master positive relay and the master negative relay are located at the battery pack system branch.

Preferably, a connecting manner of the transmission cable of high voltage heating between the heating subsystems among the heating system branch is same as a connecting manner of the transmission cable of high voltage electricity between the battery packages among the battery pack system branch.

Comparing to the prior art, the present application has the following benefit effect: the battery heating system of the present application can satisfy the two modes of driving-heating and parking-charging-heating, and provide experience of various modes to users; the installing location of the heater is various, assembling is simple and convenient, which is suitable for different application situations; the connecting manner of the circuit of the heating system is various, the connection of the circuit is simple; which can reduce the non-uniformity of the temperature of the battery caused by heating.

1. Battery package;
11. Battery module
12. Heating subsystem;
121. Heater;
2. Relay;
21. Positive relay of heating;
22. Negative relay of heating;
23. Master positive relay;
24. Master negative relay;
3. Transmission cable of high voltage electricity;
4. Transmission cable of high voltage heating;
5. Connector of charging gun;
51. Positive interface of charging gun;
52. Negative interface of charging gun

DESCRIPTION OF EMBODIMENTS

Hereinafter, embodiments of a battery heating system 100 of the present application will be illustrated referring to FIGS. 1-7(a)-(c).

Figure 1:
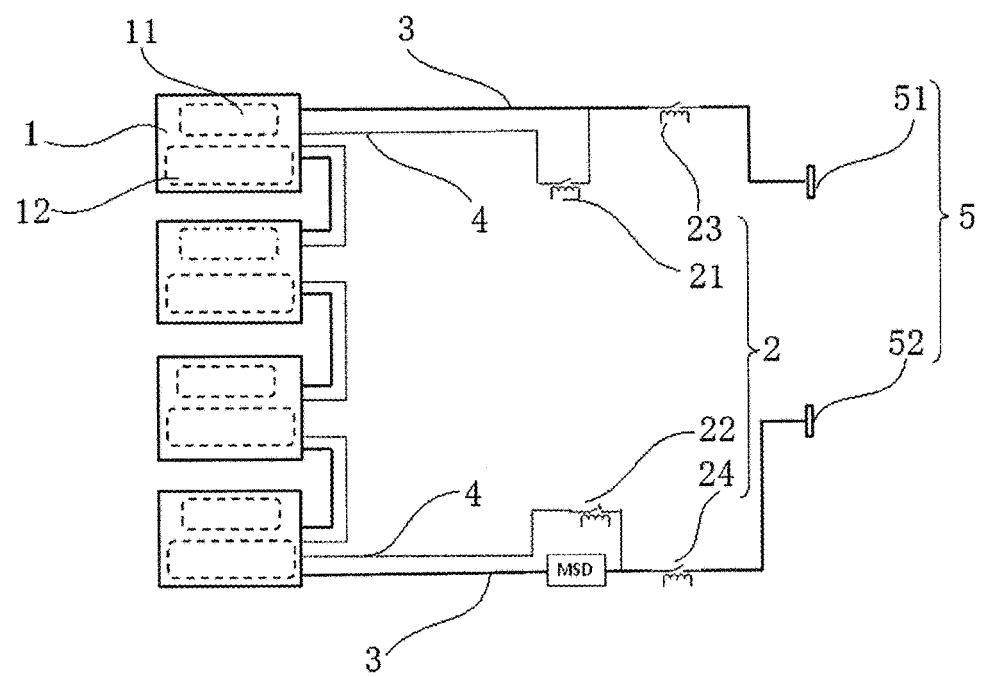
FIG. 1 is a frame diagram showing the principle of a battery heating system according to the present application.

As shown in FIG. 1, the battery heating system of the present application is composed of a heating system branch and a power battery pack system branch. The battery pack system branch includes a battery package 1 and a number of relays 2, the battery package 1 includes a number of battery modules 11 and a heating subsystem 12, and the heating subsystem 12 includes a number of heaters 121. The heating system branch and the battery pack system branch are connected in parallel, and the relay 2 is used to control the two branches, which leads to that the power supply of the heating system comes from either an outer charging pile or the power battery pack itself. The relay 2 includes a positive relay of heating 21, a negative relay of heating 22, a master positive relay 23 and a master negative relay 24, the positive relay of heating 21 and the negative relay of heating 22 are located at the heating system branch, the master positive relay 23 and the master negative relay 24 are located at the battery pack system branch.

The heating system branch includes the heating subsystem 12 (such as PTC plate or heating film and so on), the positive relay of heating 21 and the negative relay of heating 22, the heating subsystem 12 includes a number of heaters 121. The heating subsystems 12 between the battery packages 1 connected by transmission cable of high voltage heating 4 are connected in series or in parallel. At present, for power battery, the number of the battery packages 1 in the whole vehicle is no larger than 20. Common connection manners between the heating subsystems are: all serial connection, double parallel branches, and triple parallel branches. Preferably, the connecting manner of transmission cable of high voltage heating 4 between the heating subsystems of the heating system branch is same as the connecting manner of the transmission cable of high voltage electricity 3 between the battery packages 1 of the power pack system branch. In this way, it is beneficial to reduce the complexity of the electrical connecting manner between the battery packages, simplify the process of wires connection. The heating subsystems between the battery packages 1 of the embodiments of the present application all use the manner of serial connection.

The power battery pack system branch is composed of a battery package 1 and a number of relays. There are two manners of power supply, the manner of alternative current and the manner of direct current, thus a parallel connection is adopted to be compatible to the two kinds of charging interfaces. The electric current coming from outside into the system is switch controlled on the main circuit through the positive relay and the negative relay.

The heating system branch and the battery pack system branch are connected in parallel, such a connecting manner makes the system satisfy the two working modes of driving-heating, and parking-heating-charging In the driving-heating mode, the heater 121 can take advantage of the electric energy of the battery package 1 to charge so that the battery temperature can increase sharply to the best working temperature range, which is beneficial for the battery package 1 to recycle, in a low temperature, the energy of decelerating or braking, achieving the effect of energy saving, extending the cruising distance; and is beneficial to improve the discharging performance of the battery package 1 in the low temperature, making the battery work normally. At this time the interface of charging gun 5 is disconnected, the interface of charging gun 5 includes a positive interface of charging gun 51 and a negative interface of charging gun 52, the master positive relay 23 and the master negative relay 24 on the main circuit are both disconnected, the positive relay of heating 21 and the negative relay of heating 22 are closed, the electric energy of the battery pack goes into the heating system branch from the positive relay of heating 21 and the negative relay of heating 22.

In the parking-heating-charging mode, a charging pile or a household power can be used to supply power to the heater 121 to preheat the battery package 1, the system is able to reach a higher heating rate, which is beneficial to improve the charging performance of the battery package 1, achieve the purpose of quick charging, and to improve the service life of the battery package 1. At this time, the positive interface of the charging gun 51 and the negative interface of the charging gun 52 are closed, the master positive relay 23 and the master negative relay 24 on the main circuit and are both closed, the positive relay of heating 21 and the negative relay of heating 22 are closed, the energy of a charging pile or a household power starts from the external power supply, passes successively through the master positive relay 23, the positive relay of heating 21, the heating system branch, the negative relay of heating 22 and the master negative relay 24, then goes back to the external power supply. At this time, the voltage of the power supply requiring for heating is equal to the voltage of the battery pack system, so that the external power supply cannot charge the battery pack, but can transmit electric energy to the heater 121.

The connecting manner of the transmission cable of high voltage 4 between the heating subsystems of the heating system branch is same as the connecting manner of the transmission cable of high voltage electricity 3 between the battery packages 1 of the battery pack system branch. At the same time, there are various kinds of connecting manners between the installing position of the heater 121 in the battery package 1 and the heater 121, based on which various heating subsystems can be designed. In the interior of the battery pack 1, the heater 121 can be arranged at one side, two sides and the underside of the battery module 11; the heaters 121 can be connected in series or in parallel or their combination, so as to meet the design requirements of different heating systems.

Figure 2A:
FIGS. 2(a)-(c) are perspective schematic diagram of a cylindrical battery and top views of the battery module, respectively, of the battery heating system according to the present application.
Figure 2B:
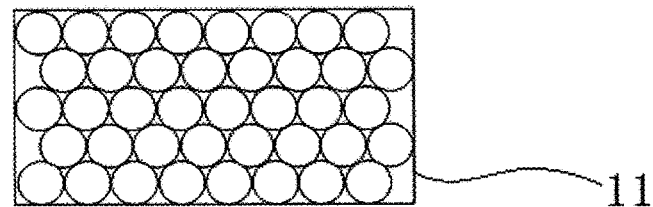
Figure 2C:
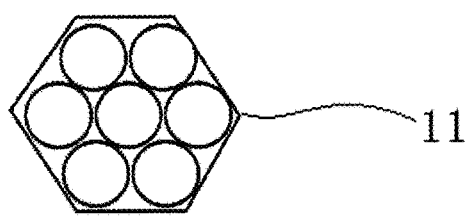
Figure 3A:
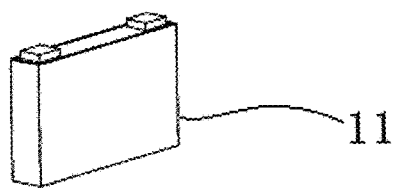
FIG. 3(a) and FIG. 3(b) are perspective schematic diagram of a cuboid battery and top view of the battery module, respectively, of the battery heating system according to the present application.
Figure 3B:
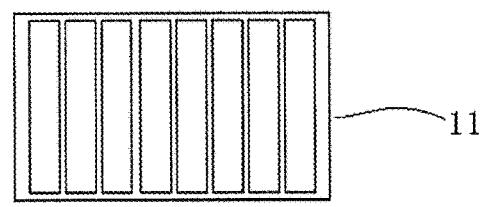

As shown in FIGS. 2(a)-(c) and FIGS. 3(a)-(b), in the industry the common battery module 11 is usually composed of circular batteries and cuboid batteries. As shown in FIG. 2(b) and FIG. 2(c), the circular batteries are usually arranged alternatively. As shown in FIG. 3(a) and FIG. 3(b), the battery module 11 in the battery package 1 of the present application uses cuboid batteries, which are arranged in parallel.

According to the principle that the connecting manner of the transmission cable of high voltage 4 between the heating subsystems of the heating system branch is same as the connecting manner of the transmission cable of high voltage electricity 3 between the battery packages 1 of the battery pack system branch, and the principle that the electrical connecting manner is same as the manner of high voltage electrical connection, there can be various kinds of connecting manners between the installation locations of the heaters 121 in the battery package 1 and the heaters 121, so that multiple heating subsystems can be provided. In the interior of the battery package 1, the heater 121 can be arranged at one side, two sides or underside of the battery module 11; the heaters 121 can be connected in series or in parallel or their combination, so as to meet the design requirements of different heating systems. In the interior of the battery pack, there can be various implementing manners of serial/parallel connection for the heaters 121 from the battery module 11 to the battery package 1. Now the minimum heating unit of the heater 121 is the battery module 11, the battery pack system branch includes a number of battery packages 1, and each battery package 1 also includes a number of battery modules 11. The present application provides three manners to arrange the heater 121 of the battery module 11, which is to assemble the heater 121 at one side of the battery module 11, two sides of the battery module 11 or underside of the battery module 11, respectively.

Figure 4A:
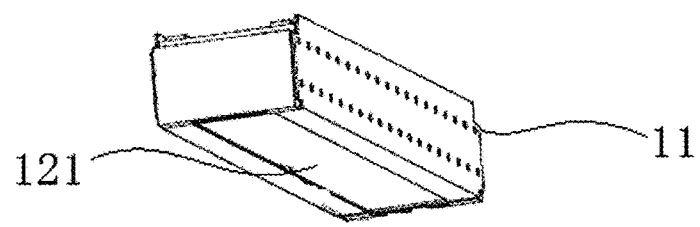
FIG. 4(a) is an assembly diagram of a first implementing manner of a heater of the battery heating system according to the present application.
Figure 4B:
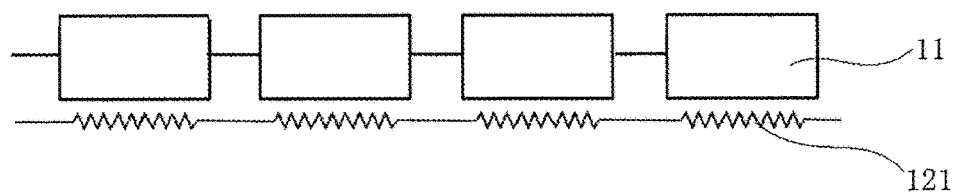
FIG. 4(b) is a schematic diagram of a connecting manner of the first implementing manner of the heater of the battery heating system according to the present application in a single battery package.

As shown in FIG. 4(a) and FIG. 4(b), in the embodiment one of the present application, each battery module 11 in the battery package 1 is assembled with a heater 121, the heater 121 is assembled at the underside of the battery module 11, the serial connecting manner is adopted between the heaters 121. Thus, the heaters 121 can be assembled or integrated to the bottom plate of the battery module 11. The implementing manner one of the present application is applicable to the battery package 1 of shelves stacking and the battery package 1 not using the bottom liquid cooling manner of the battery module 11, the assembling of wiring of the heater 121 needs a large operating space and difficulty, particularly the connection of the heaters 121 between the battery modules 11.

Figure 5A:
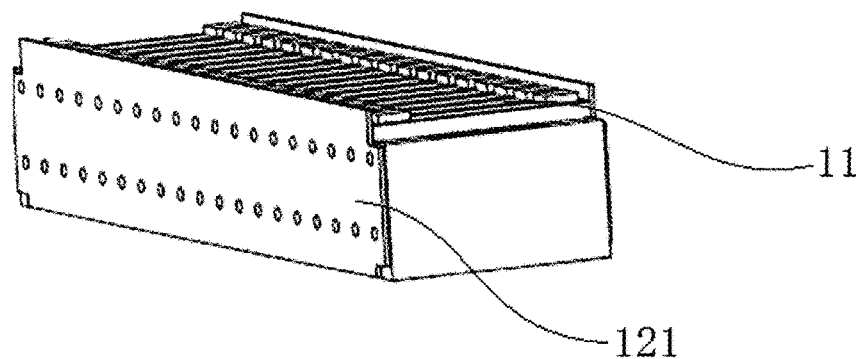
FIG. 5(a) is an assembly diagram of a second implementing manner of the heater of the battery heating system according to the present application.
Figure 5B:
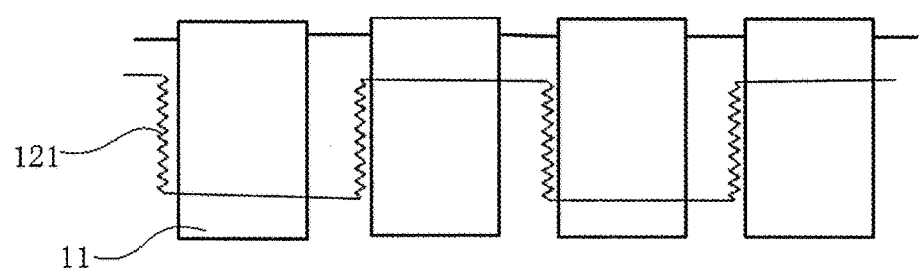
FIG. 5(b) is a schematic diagram of a connecting manner of the second implementing manner of the heater of the battery heating system according to the present application in a single battery package.

As shown in FIG. 5(a) and FIG. 5(b), in the embodiment two of the present application, a heater 121 is assembled at each battery module 11 in the battery package 1, the heater 121 is assembled at the side of the battery module 11, a serial connecting manner is adopted between the heaters 121. If such a manner is adopted, the heater 121 can be directly installed or integrated on the side plate of the battery module 11. The assembling manner of the heater 121 and wire connection are very simple, the temperature increases rapidly. However, the design manner of assembling the heater 121 at a single side of the battery module 11 is easy to cause the situation of 'back-to-back' of the heaters 121 after the battery module 11 being connected in a high pressure arrangement, which leads to the problem of the big temperature difference between battery modules 11 in the single battery package. Hence the arrangement manner of the heaters 121 is suitable for the system with less number of battery packages 1, such as a system with one to four battery packages 1, so that the temperature difference of the whole battery core of this system is controlled within the requirement by the service life.

Figure 6A:
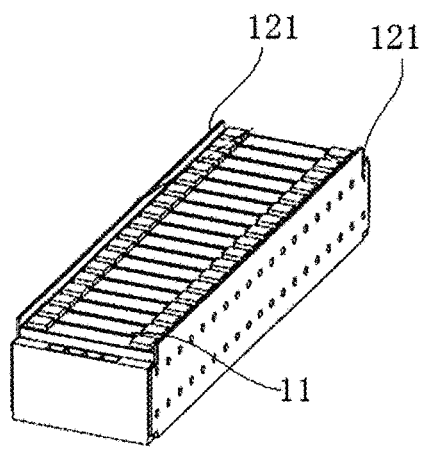
FIG. 6(a) is an assembly diagram of a third implementing manner of the heater of the battery heating system according to the present application.
Figure 6B:
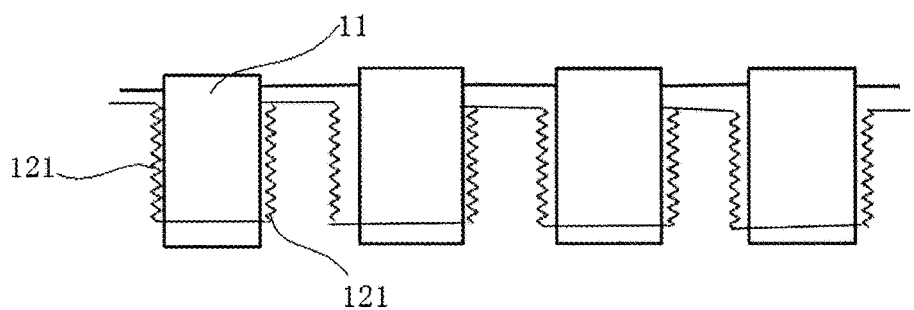
FIG. 6(b) is a schematic diagram of a connecting manner of the third implementing manner of the heater of the battery heating system according to the present application in a single battery package.

As shown in FIG. 6(a) and FIG. 6(b), in the embodiment three of the present application, two heaters 121 are assembled at each battery module 11 in the battery package 1, the heaters 121 are assembled at two sides of the battery module 11, a serial connecting manner is adopted between the heaters 121. If such manner is adopted, the heaters 121 can be assembled or integrated to the two side plates of the battery module 11. The manner is suitable for the situation that the total voltage of heating is small but current of heating is small. Although, each module assembles two heaters 121, which will increase a certain amount of cost, however, the battery module 11 of this design is a symmetrical battery module 11, the uniformity of the temperature is better than assembling the heater 121 at one side, which is suitable for various types of arrangements of the battery package 1 and is universal, which can be adopted as a standardization platform of the battery module 11, and is more suitable for mass production.

Figure 7A:
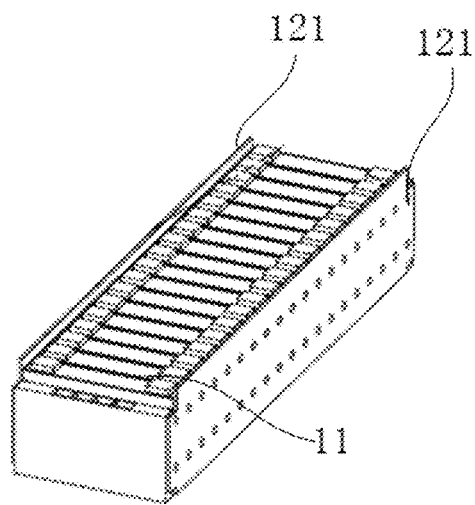
FIG. 7(a) is an assembly diagram of a fourth implementing manner of the heater of the battery heating system according to the present application.
Figure 7B:
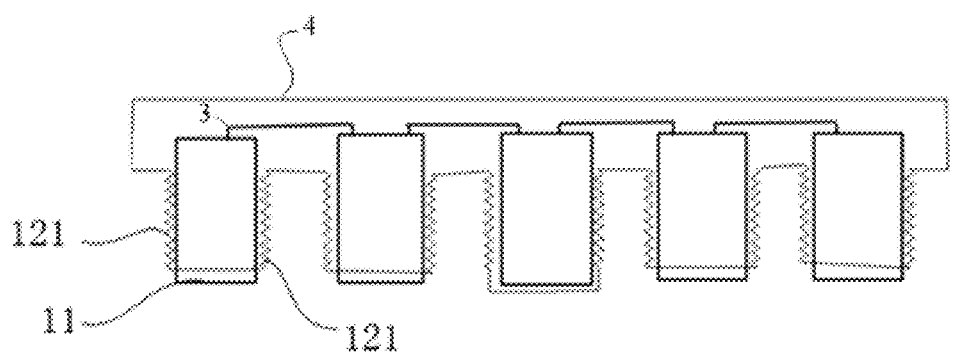
FIG. 7(b) is a schematic diagram of a connecting manner of the fourth implementing manner of the heater with an odd number of the battery heating system according to the present application in a single battery package.
Figure 7C:
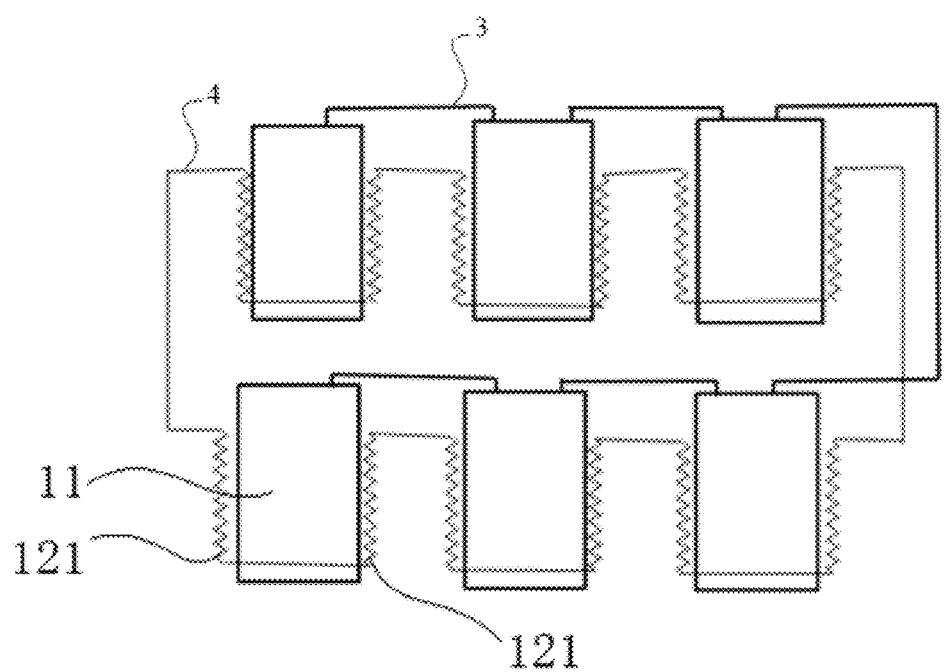
FIG. 7(c) is a schematic diagram of a connecting manner of the fourth implementing manner of the heater with an even number of the battery heating system according to the present application in a single battery package.

As shown in FIGS. 7(a)-(c), in the embodiment four of the present application, two heaters 121 are assembled at each battery module 11 in the battery package 1, the heaters 121 are assembled separately at two sides of the battery module 11, the two heaters 121 of each battery module 11 are connected in parallel, and the heaters 121 between the battery modules 11 are connected in series. As shown in FIG. 7(b) and FIG. 7(c), the connecting manners of the heaters with odd and even number of the battery modules 11 in each battery package 1 is slightly different. The heater 121 of the embodiment four of the present application can be assembled or integrated to the side plate of the battery module 11. In this way, the heater 121 can be assembled simply, the temperature of the battery module 11 rises rapidly, the temperature distribution is uniform during the heating process, which is suitable for the situation with low total voltage of heating and large current of heating of single battery package 1.

The present application uses the manner of integrating the heating system branch and the battery pack system branch in parallel, so that the heating system branch and the battery pack system branch are controlled through four relays. The driving-heating mode and the parking-heating-charging mode of the heating system branch are controlled by the state of the four relays. In the parking-heating-charging mode, the external heating voltage required is the voltage of the battery pack system. In the design of the heating system branch, the heaters 121 between the battery packages 1 use the same design principle as the high voltage heating between the battery packages 1. Meanwhile, the present application provides various connecting manners of the wire of the heater 121, which is suitable for the situation of different battery packages 1.

The above are part of the embodiments of the present application, not all of them, any equivalent variations made by those skilled in the art to the technical solutions of the present application after reading the specification of the present application shall be covered by the claims of the present application.

What is claimed is:

1. A battery heating system integrated by two subsystems of a heating system branch and a battery pack system branch, the battery pack system branch includes a battery package and a number of relays, wherein the battery package includes a plurality of battery modules and heating subsystems, the heating subsystem includes a plurality of heaters, the battery module is assembled with at least one the heater, the heater is arranged at bottom or side of the battery module,
wherein the heating system branch and the battery pack system branch are controlled by four relays, so as to achieve a driving-heating mode and a parking-heating-charging mode, the relay includes a positive relay of heating, a negative relay of heating, a master positive relay and a master negative relay, the positive relay of heating and the negative relay of heating are located at the heating system branch, the master positive relay and the master negative relay are located at the battery pack system branch, and
wherein in the driving-heating mode, the master positive relay and the master negative relay are both disconnected and the positive relay of heating and the negative relay of heating are both closed, such that electric energy of the battery module goes into the heating system branch from the positive relay of heating and the negative relay of heating; and in the parking-heating-charging mode, the master positive relay and the master negative relay are both closed and the positive relay of heating and the negative relay of heating are both closed, such that an external power supply cannot charge the battery module, but can transmit electric energy to the heater.

2. The battery heating system according to claim 1, wherein the heater is assembled or integrated to the battery module.

3. The battery heating system according to claim 1, wherein the heaters are connected in series or in parallel or their combination.

4. The battery heating system according to claim 1, wherein the heaters are arranged at two corresponding sides of the battery module.

5. The battery heating system according to claim 1, wherein the number of the battery module is odd or even.

6. The battery heating system according to claim 5, wherein the heaters are connected in a parallel manner, the even battery modules in the battery package are divided into at least two groups, the heaters arranged on the battery modules of different groups are connected in parallel; all the heaters at different sides of the battery modules located in the middle of the odd battery modules are connected in parallel.

7. The battery heating system according to claim 6, wherein the heaters arranged on the battery modules of a same group among the even battery modules are connected in series; all the heaters arranged at a same side of the battery module in the middle of the odd battery modules are connected in series.

8. The battery heating system according to claim 1, wherein all the heaters are connected in series.

9. The battery heating system according to claim 1, wherein a connecting manner of the transmission cable of high voltage heating between the heating subsystems of the heating system branch is same as a connecting manner of the transmission cable of high voltage electricity between the battery packages of the battery pack system branch.

* * * * *